United States Patent [19]

Brown

[11] 4,152,852
[45] May 8, 1979

[54] TRANSPARENCY VIEWER ASSEMBLY

[75] Inventor: Donald J. Brown, Naperville, Ill.

[73] Assignee: Knox Manufacturing Co., Wood Dale, Ill.

[21] Appl. No.: 868,984

[22] Filed: Jan. 12, 1978

[51] Int. Cl.$^2$ ............................................. G02B 27/02
[52] U.S. Cl. ..................................................... 40/361
[58] Field of Search .............. 40/361, 366, 367, 152.2, 40/152.1; 248/441

[56] References Cited

U.S. PATENT DOCUMENTS

| | | | |
|---|---|---|---|
| 1,138,302 | 5/1915 | Malone | 248/441 |
| 1,846,533 | 2/1932 | Thompson | 40/361 |
| 2,534,637 | 12/1950 | Sussin | 40/361 |
| 3,246,412 | 4/1966 | Sommerhoff | 40/361 |
| 3,330,524 | 9/1967 | Foley | 248/441 |
| 3,541,711 | 11/1970 | Ohlson | 40/361 |

Primary Examiner—Louis G. Mancene
Assistant Examiner—Wenceslao J. Contreras
Attorney, Agent, or Firm—Wegner, Stellman, McCord, Wiles & Wood

[57] ABSTRACT

A pair of illuminated transparency viewers may be mounted on a supporting frame assembly so that one viewer generally provides a horizontally oriented viewing surface and the other viewer generally provides a vertically oriented viewing surface. The frame assembly includes a base portion adapted to receive the legs of one of the viewers and an upright portion adapted to receive the legs of the other viewer. The base portion and the upright portion each have a U-shaped cross section to define an open channel into which the respective legs of the viewers are inserted and secured by appropriate means. Two frame assemblies are utilized to mount the viewers which have two leg assemblies, each of which, in turn, has a leg pivotally mounted for movement between retracted and extended positions.

8 Claims, 18 Drawing Figures

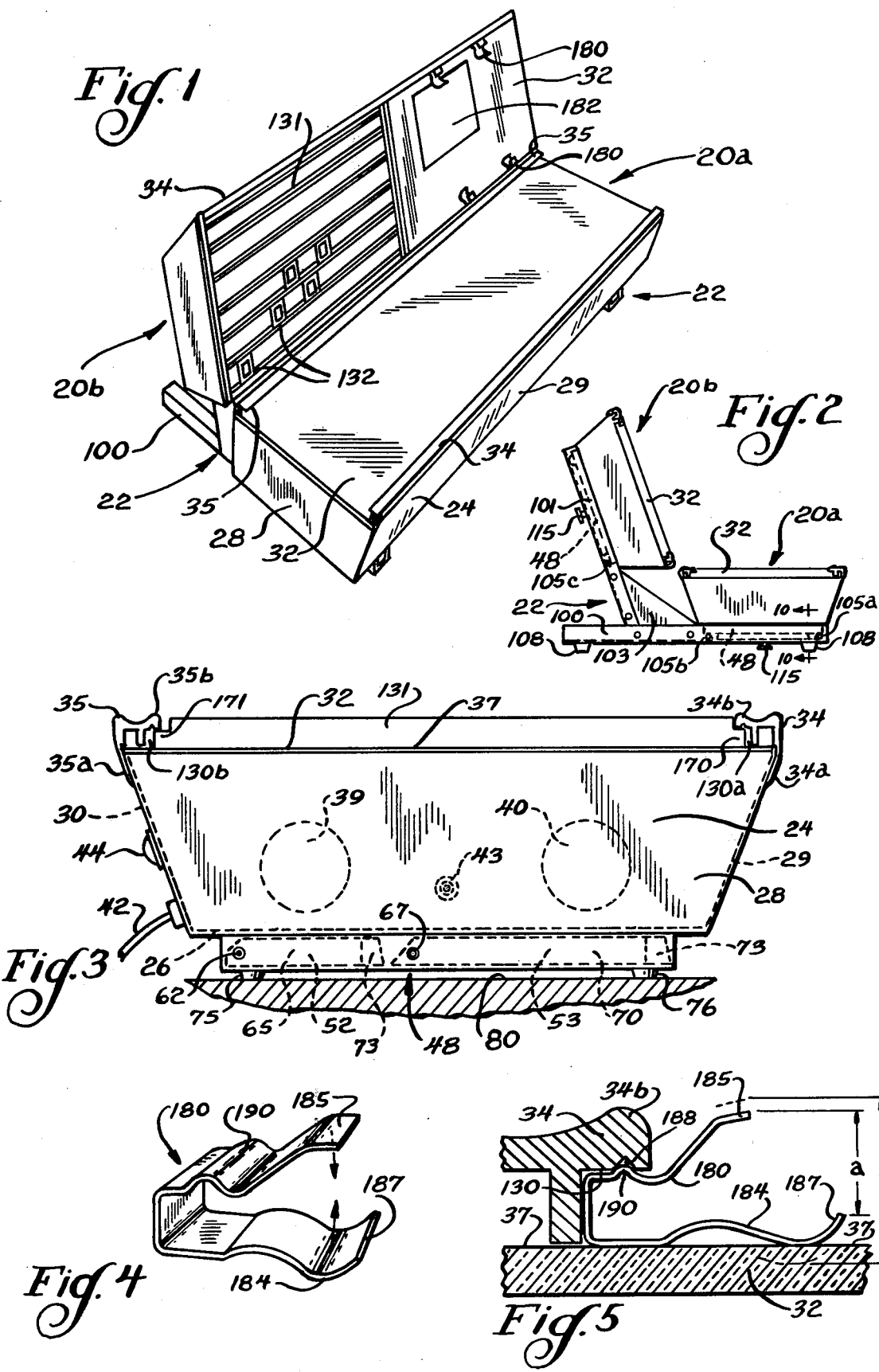

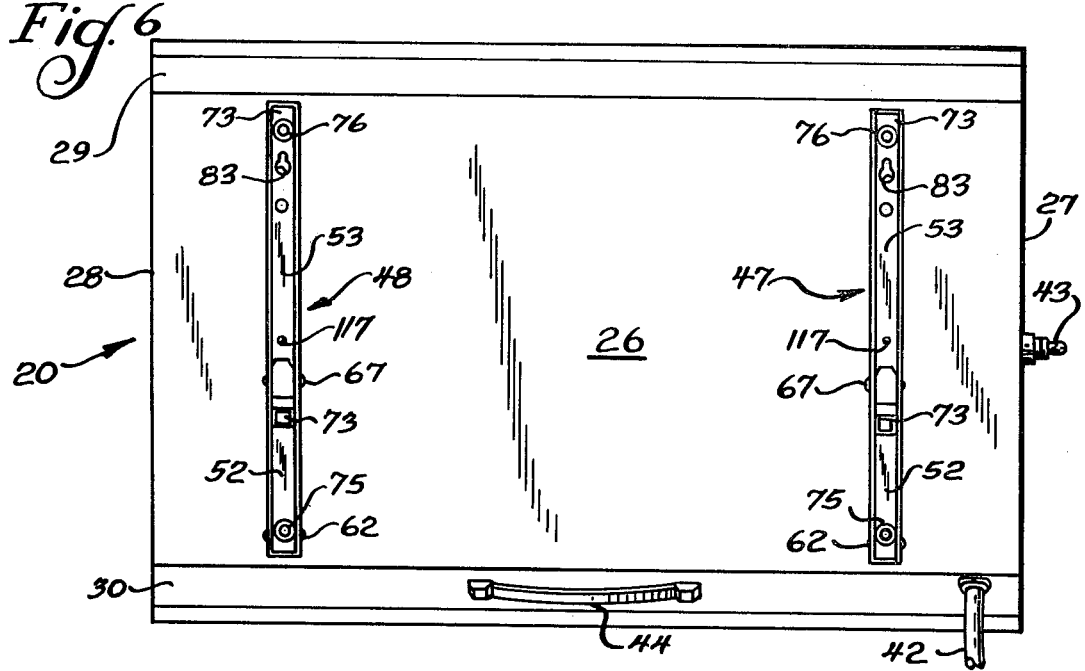
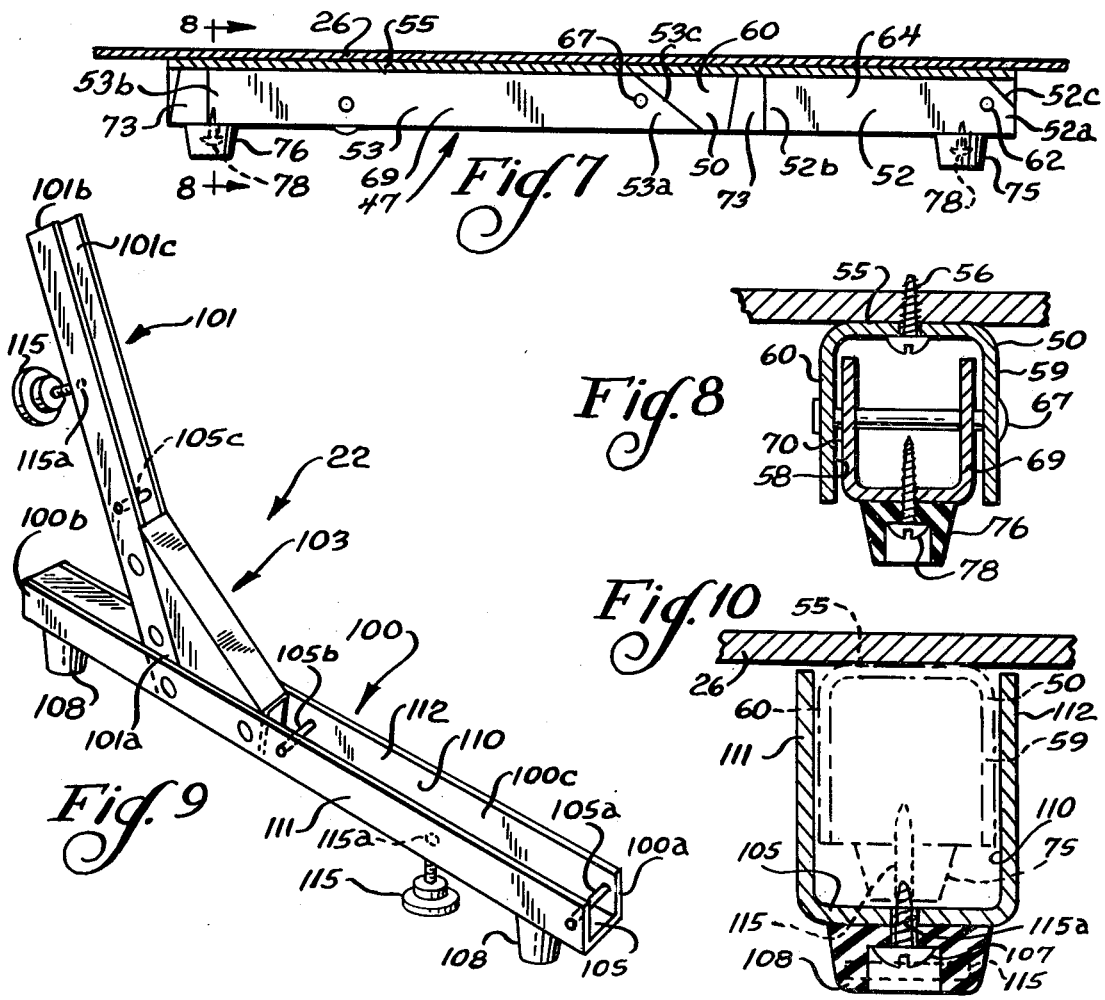

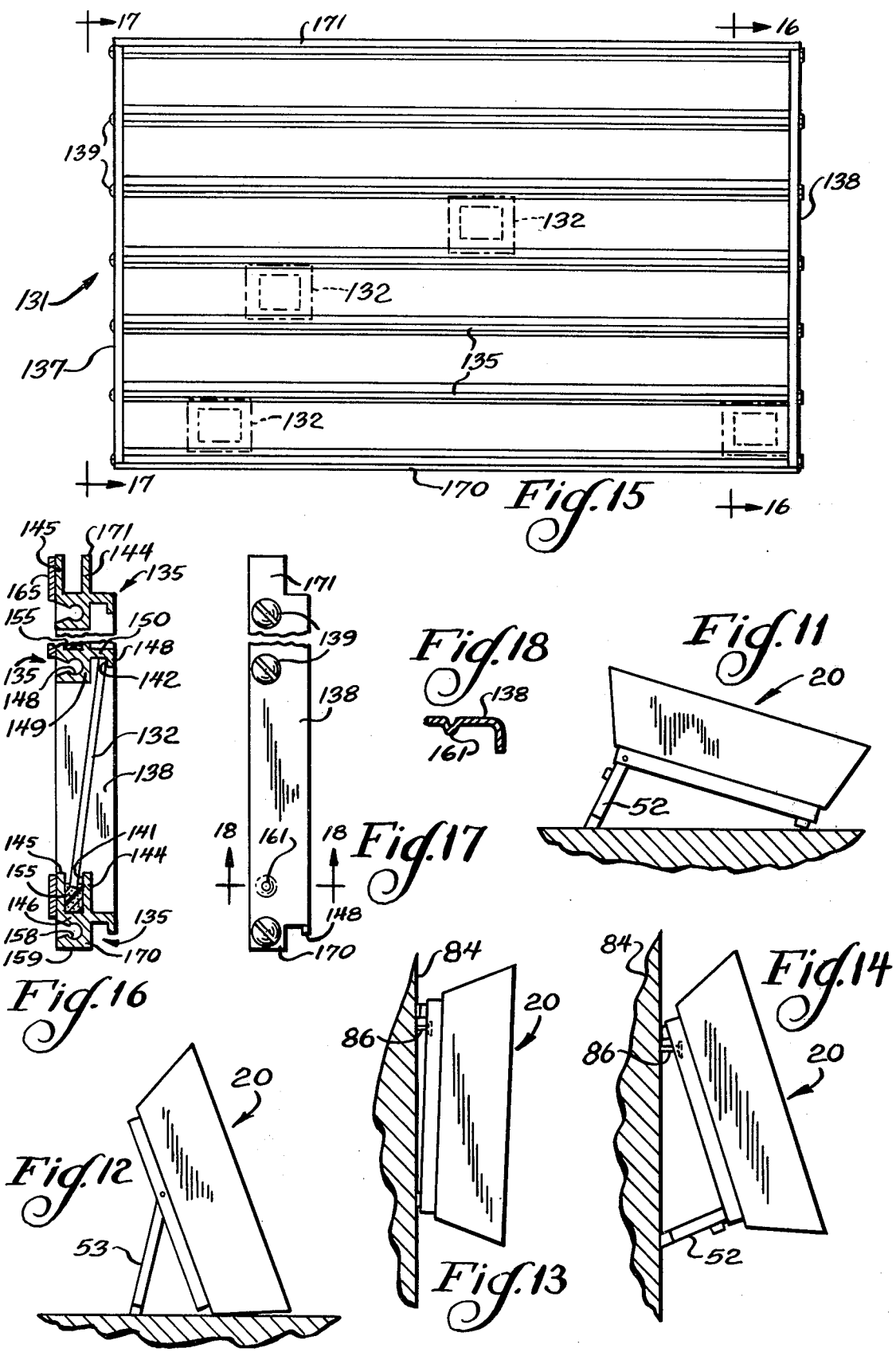

[4,152,852]

TRANSPARENCY VIEWER ASSEMBLY

BACKGROUND OF THE INVENTION

This invention relates generally to a light box for viewing transparencies and the like and, more particularly, to a supporting frame assembly for mounting a pair of transparency viewers in suitable position.

Illuminated transparency viewers, or light boxes, commonly have a light source for providing a strong uniform light on a translucent surface to enable negatives, transparencies, slide and the like to be conveniently examined. Typically, such viewers are employed for editing or sorting and sequencing of such transparencies and slides.

In the prior art, it has been known to utilize two or more such viewers to provide a greater viewing area. Oftentimes, one illuminated viewer is mounted so as to position the translucent surface in a nearly horizontal plane, while another illuminated viewer is mounted so as to position its translucent surface in a nearly vertical plane. Such a configuration permits a user to be seated with the first illuminated viewer acting as a tabletop and permits the user to view both translucent surfaces and have convenient access to materials placed on or supported by either of the illuminated viewers.

When a pair of illuminated viewers have been used in combination in the aforementioned manner, the viewers have been mounted in a specially constructed and configured table such that the viewers cannot be conveniently utilized separately. Such illuminated viewers did not always include an integral leg assembly to permit a single viewer to be adapted for use on a conventional table and yet provide a means for adjusting the orientation of the translucent surface relative to the table.

Some light boxes have been designed to be used as single units and have provided leg supports which permitted slight adjustments to the orientation of the translucent surface relative to the supporting surface. However, when two such light boxes were employed in combination to provide horizontal and vertical translucent viewing surfaces, open U-shaped brackets were employed and anchored to the housing of each illuminated viewer. The supporting leg assemblies were either removed and/or replaced by the brackets which were secured in the same manner as the legs had been. Sometimes, the leg assemblies were left in place and the brackets were secured to the viewer housing. This latter method required that the illuminated viewer housing be constructed to provide means for permitting both the leg assemblies and the brackets to be secured thereto.

SUMMARY OF THE INVENTION

It is the principal object of the present invention to provide a supporting frame assembly capable of mounting two illuminated viewers in suitable position, each viewer having an adjustable leg assembly which is retained in place when the frame assembly is utilized and to which the frame assembly is secured.

In accordance with the invention, a supporting frame is provided having a base adapted to be positioned on a supporting surface and an upright connected to the base near the rearward end thereof with the base being connected to one illuminated viewer and the upright being connected to a second illuminated viewer. Each viewer has an adjustable leg assembly extending from the bottom surface of the viewer housing which is insertable into channels defined in the respective base and upright.

In an exemplary embodiment of the present invention, means are provided for securing the base of the supporting frame to a leg assembly of one viewer and means for securing the upright to the leg assembly of a second viewer. The viewers herein each have two leg assemblies so that two frame assemblies are employed to fixedly mount the transparency viewers in predetermined relation.

In a preferred embodiment of the invention, the frame assembly is constructed so that the base and the upright both have U-shaped cross sections. Both the base and the upright have a center section and spaced apart side walls defining respective open channels. The leg assemblies of the respective illuminated viewers are inserted into the open channels and have a height greater than the length of the frame side walls so that the leg assemblies are supported at the bottom of the respective open channels. Thumbscrews are provided and are inserted into the respective bases and uprights and threaded into apertures formed in the leg assemblies of the respective illuminated viewers to secure the viewers to the frame.

BRIEF DESCRIPTION OF THE DRAWINGS

FIG. 1 is a perspective view of two transparency viewers mounted on a frame to provide horizontal and vertical viewing potential;

FIG. 2 is a side elevational view of the two transparency viewers and the frame shown in FIG. 1;

FIG. 3 is a side elevational view of a single transparency viewer positioned on a horizontal surface;

FIG. 4 is an enlarged perspective view of a clip which may be used in connection with the transparency viewer to hold transparencies thereon;

FIG. 5 is an enlarged, fragmentary, cross-sectional view of the clip of FIG. 4 disposed in a groove defined between the viewer frame and the translucent sheet;

FIG. 6 is a bottom plan view of the transparency viewer of FIG. 3 showing the disposition of the leg assemblies;

FIG. 7 is a side elevational view of a leg assembly shown in FIG. 6 with certain side parts broken away to show the small and large pivoted legs in nested position;

FIG. 8 is an enlarged, cross-sectional view taken along line 8—8 of FIG. 7 showing one of the leg assemblies secured to the bottom of the transparency viewer;

FIG. 9 is a perspective view of one of the frame assemblies which supports the transparency viewers in FIG. 1;

FIG. 10 is an enlarged cross-sectional view of the frame assembly and leg assembly taken along line 10—10 of FIG. 2 showing the relationship thereof when engaged;

FIG. 11 is a schematic diagram showing the short legs extended to tilt the transparency viewer at a slight angle from horizontal;

FIG. 12 is a schematic diagram showing the long legs extended to tilt the transparency viewer at a greater angle than shown in FIG. 11;

FIG. 13 is a schematic diagram showing the transparency viewer mounted against a wall surface;

FIG. 14 is a schematic diagram showing the short legs extended to tilt the transparency viewer slightly away from the wall;

FIG. 15 is a front elevational view of the overlay shown with the transparency viewers in FIGS. 1 and 3;

FIG. 16 is an enlarged cross-sectional view of the overlay taken along line 16—16 of FIG. 15 showing the configuration of the overlay channel members and a slide held there-between;

FIG. 17 is an enlarged side elevational view of the overlay of FIG. 15 taken along line 17—17; and FIG. 18 is an enlarged, cross-sectional view of the end piece secured at the opposite ends of the channel members taken along line 18—18 of FIG. 17.

DESCRIPTION OF THE PREFERRED EMBODIMENT

Referring to FIGS. 1-3, transparency viewers, designated 20, are illustrated in combination (FIGS. 1 and 2) and singly (FIG. 3). Although each transparency viewer is constructed similarly, for clarity herein, the horizontal viewer will be designated 20a and the rear, uprightly disposed viewer will be designated 20b. As will be described in more detail hereinafter, when the transparency viewers are used in combination, two frame assemblies, each generally designated 22, support one transparency viewer 20a in a horizontal position and a second transparency viewer 20b in an inclined upright position.

The transparency viewer 20 generally includes a metal housing 24 configured to define a bottom wall 26, spaced apart side walls 27 and 28, and inclined front and rear walls 29 and 30, respectively. The upper end of the housing 24 is closed by a rectangular flat sheet of translucent material 32, such as plexiglass. The translucent sheet 32 is supported on the upper edges of the side walls 27 and 28, the front wall 29 and the rear wall 30, and is secured in place by a pair of elongate retainer brackets 34 and 35 which overlie the upper surface 37 of the translucent sheet 32 and are secured, as by screws (not shown), respectively to the front wall 29 and to the rear wall 30.

Illuminating means, such as fluorescent tubes 39 and 40, generally extending between the side walls 27 and 28 within the housing 24 provide a conventional light source, preferably of nearly white coloration. The tubes are actuated by a source of electric power through cord 42 which may be externally controlled by push-button switch 43 carried by the side wall 27. A handle 44 may be mounted on the rear wall 30 to provide a convenient means for carrying the viewer.

1. Supporting Leg Assembly For a Transparency Viewer

The supporting leg assemblies, generally designated 47 and 48, are best seen in FIG. 6-8 and 11-14. The supporting leg assemblies 47 and 48 are each spaced apart on the exterior of the bottom wall 26 and each extends preferably in parallel fashion generally between the respective edges of the front wall 29 and the rear wall 30. Because each of the supporting leg assemblies 47 and 48 is similarly constructed, in the interest of brevity and clarity, only one will be described in detail.

The supporting leg assembly 47 broadly preferably includes a channeled bracket or leg support 50, affording a U-shaped cross section together with a short leg 52 and a long leg 53, each also preferably being of U-shaped cross section.

The leg support 50 is positioned on the bottom wall 26 so that its center portion 55 rests against the exterior surface of the bottom wall 26 and is secured thereto by one or more screws 56 so that a downwardly opening channel 58 is defined by the downwardly depending side walls 59 and 60 of the leg support 50.

The colinearly arranged legs 52 and 53 may have an orientation opposite that of the leg support 50 and are of such size as to be nestably disposed within the open channel 58. The leg 52 is relatively short and has a rearward end 52a which is pivotally mounted to side walls 59 and 60 within the channel 58 at the rearward end thereof by a rivet 62 which extends through the side walls 59 and 60 of the leg support 50 and through the side walls 64 and 65 of the leg 52. Similarly, the relatively long leg 53 is pivotally mounted within the channel 58 by a rivet 67 which passes through the side walls 59 and 60 of the support 50 and through the side walls 69 and 70 of the leg 53 adjacent the end 53a thereof. The free ends 52b and 53b of the legs 52 and 53, respectively, are fitted with end caps 72 and 73, respectively. Rubber grommets 75 and 76 function as resilient feet and are secured adjacent the end 52a of the leg 52 and the end 53b of the leg 53 by screws 78.

As seen in FIG. 3, the transparency viewer 20 is horizontally disposed on a flat supporting surface by retracting or pivoting the legs 52 and 53 into nested position with respect to the channel 58 of the leg support 50 so that the grommets 75 and 76 support the viewer 20 on the horizontal surface 80. By pivotally mounting the short legs 52 at the rear of the housing 24 and the long legs 53 near the center of the housing 24, the degree of adjustments is increased for a predetermined leg length. To tilt the viewer at an angle of approximately 15° relative to horizontal as seen in FIG. 11, each short leg 52 is extended by pivoting it downwardly out of the channel 58 about the rivet 62 until the rearward edge 52c abuts the center portion 55 of the leg support 50. To position the transparency viewer 20 at an angle of approximately 70° relative to horizontal as in FIG. 12, each long leg 53 is extended by pivoting it downwardly out of the channel 58 about the rivet 67 until the rearward edge 53c abuts the center portion 55 of the leg support 50.

Means may be provided by way of key slots 83 in leg assemblies 47 and 48 for mounting the transparency viewer on an upright surface, such as wall 84 into which a nail 86 or similar anchored retainer has been driven. The key slot 83 is preferably formed adjacent the free end 53b of the leg 53. To prevent the leg 53 from pivoting about the rivet 67 when the transparency viewer 20 is hung on the wall 84, a screw (not shown) is threaded into one of the side walls 59 and 60 of the leg support 50 and into one of the side walls 69 and 70 of the leg 53. As a result, the transparency viewer 20 can be arranged in a vertical position as shown in FIG. 13 or can be positioned at an angle approximately 15° from vertical by extending the legs 52 as shown in FIG. 14.

2. Frame Assembly for Utilizing the Transparency Viewer in Combination

The frame assembly 22 includes a base 100 having a U-shaped cross-section, an upright support 101 having a U-shaped cross-section, and a bracing member 103 connected between the base 100 and the upright 101 to afford strength and structural support therefor. The base 100 has a forward end 100a and a rearward end 100b. The upright support 101 has a lower end 101a secured to the base 100 at a point intermediate the ends 100a and 100b, and is inclined rearwardly at an angle of approximately 70° so that its upper end 101b, overlies the rearward end 100b of the base 100. The base 100 has a forward portion 100c between its forward end 100a and the bracing member 103 of sufficient length to support the horizontal viewer 20a. Similarly, the upright support 101 has an upper portion 101c between its upper end 101b and the member 103 of sufficient length to support the uprightly inclined viewer 20b. Secured to the underside of the center wall portion 105 of the base 100 adjacent the ends 100a and 100b by screws 107 are resilient pads, or grommets 108, which act as feet to support the base 100 on a supporting surface.

As best seen in FIG. 10, when the frame assembly 22 is utilized, the leg supports 50 of the viewer 20a are of a size and shape to be nestably positioned within the channels 110 defined by side walls 111 and 112 of the base 100. The side walls 111 and 112 are spaced apart sufficiently so that a leg support 50 may be easily inserted into the channel 110. The side walls 111 and 112 have a height such that when the leg support 50 is inserted within the channel 110, the grommets 75 and 76 abut the interior of the center wall portion 105 with the ends of the side walls 111 and 112 spaced from the bottom wall 26 of the housing 24. A knurled thumbscrew 115 inserted through an aperture 115a formed in the center portion 105 of the base 100 is threaded into a suitably aligned threaded aperture 117 positioned adjacent rivet 67 and formed in the center portion of leg 53. Thus the thumbscrews 115 releasably secure each of the frame assemblies 22 to the leg assemblies 47 and 48 of each viewer 20a and 20b to support the viewers in the manner shown in FIG. 1. Similar thumbscrews 115 are provided for the upright supports 101 of each frame assembly 22 so as to retain viewer 20b in upright position in the manner previously described. Thus it is understood that two frame members 100 (FIG. 9) support the transparency viewers 20a and 20b.

Referring again to the frame assembly 100 of FIG. 9, each such assembly preferably has location pins 105a, 105b, and 105c secured within U-shaped base 100 and U-shaped support 101. These pins are positioned so that the supporting rubber grommets of each leg assembly 47 and 48 bear against the pins when the leg assemblies are properly positioned with respect to the frame assemblies 22. Such proper positioning aligns each thumbscrew 115 with aperture 115a and threaded aperture 117 to facilitate the securement of frame assemblies 22 to viewers 20a and 20b.

3. Transparency Viewer Overlay and Film Retaining Clips

The retaining brackets 34 and 35 secure the translucent sheet 32 to the housing 24. The brackets 34 and 35 are configured to have mounting portions 34a and 35a, respectively, secured to the housing and longitudinally extending portions 34b and 35b, respectively, overlying and spaced from the translucent sheet 32 so as to define along the forward and rearward edges of the translucent sheet 32 respective open longitudinal channels 130a and 130b, which are collectively designated 130.

As seen in FIGS. 1 and 3, an overlay device, generally designated 131, may be positioned against the translucent sheet 32 by moving the overlay device 131 into the respective channels 130, the ends of which are preferably open. The overlay 131 releasably holds a plurality of relatively stiff photographic slides 132. As shown herein, the slides are of similar size; however, the overlay device may be adjustably structurally arranged to accommodate slides of varying sizes. The slides 132 typically have a transparency film surrounded by a cardboard border.

The overlay 131 is preferably made up of a series of parallel, similarly constructed elongate members 135 which are connected at each end thereof to frame members 137 and 138, respectively, by screws 139 so that the elongate members 135 are held in fixed relation.

As seen in FIG. 16, each of the elongate members 135 is preferably of extruded aluminum and is configured to define a pair of longitudinal open channels 141 and 142, respectively. The open longitudinal channel 141 is defined by a forward wall 144, a rearward wall 145 spaced from the forward wall 144, and a bottom wall 146. The open longitudinal channel 142 is defined by a relatively short depending forward wall 148, a rearward wall 149 spaced from the forward wall 148, and a bottom wall 150 which faces in opposed relation to the bottom wall 146 and preferably is offset forwardly therefrom when the overlay device 131 is positioned as shown in FIG. 16. Thus channel 142 is preferably positioned forwardly of the channel 141 so that a transparency slide 132 will be held in tilted position with its upper edge forward of its lower edge (FIG. 16). Stated another way, when the overlay device 131 is positioned as in FIG. 3, the upper edge of a slide 132 will be tiled upwardly and occupy a position above that of the lower edge of a slide 132.

The channels 141 and 142 extend continuously between the oppositely disposed frame members 137 and 138. Resilient material 155, which may be of foam rubber or foamed plastic such as polyurethane, is disposed preferably within the open channel 141. Herein, the resilient material 155 preferably has a width greater than the distance between the walls 144 and 145 so that when material 155 is compressed and inserted within each of the channels 141, the inherent resiliency of the material is sufficient to effect functional engagement with each of the walls 144 and 145 to retain the resilient material 155 firmly in place.

It should be appreciated that the cross-sectional shape or configuration of the resilient material 155 may take a variety of forms to accommodate varying cross-sectional shapes of channel 141. It is also contemplated that the resilient material may be adhered in place.

As can best be seen in FIG. 16, the open channel 141 of one elongate member 135 faces, i.e., opens toward, the open channel 142 of the preceding elongate member in the series. The distance between the exposed surface of the resilient material 155 and the wall 150 of the opposed open channel 142 of an adjacent elongate member 135 is arranged to be less than the height of the transparency slide or slides 132 which are to be placed between two adjacent elongate members 135.

To place a slide in secure position in the overlay device 131, the slide is inserted into the open channel 141 by compressing the resilient material 155 of one elongate member 135 and then the upper end of the slide (FIG. 16) is positioned within the channel 142 of the adjacent elongate member 135. The inherent resiliency of the resilient material 155 maintains each slide 132 firmly in position on the overlay device. Thus the slides remain in their preselected position even if the overlay device 131 is tipped throughout 360°, or knocked over, or jarred when placed in storage position in a cabinet enclosure. These features are important where considerable time has been consumed in editing and sorting slides for a business, medical, or educational presentation.

Referring again to resilient material 155, it is within the concept of the present invention that such material be positioned in either channel 141 or 142, and also, that such material 155 may be positioned within both adjacent channels 141 and 142.

As best seen in FIG. 16, narrow, screw-receiving longitudinal concavities 158 are defined in each elongate member 135 by the bottom wall 146, the rearward wall 149 and wall 159. The cross-section of each concavity is of a size to securely receive the screws 139. Each of the frame members 137 and 138 has a plurality of stamped protrusions 161 each of which is positioned to precisely locate an end of each of the elongate members 135 when the overlay device is being assembled. As best seen in FIG. 16 and FIG. 17, each protrusion 161 extends onto an end of channel 141 so as to maintain proper orientation of the elongate members relative to frame members 137 and 138 during assembly. To prevent marring of the translucent sheet 32, padding or tape 165 is secured to each of the elongate members 135 along the rear surface of the rearward wall 145.

As seen in FIGS. 15-18, the overlay 131 has relatively narrow lower and upper marginal edge portions, generally designated 170 and 171, respectively. As seen in FIG. 3, the lower and upper marginal edges 170 and 171 are positioned rearwardly and forwardly, respectively. The overlay 131, when retained adjacent the translucent sheet 32, has the respective marginal edge portions 170 and 171 inserted into the channels 130a and 130b defined by the brackets 34 and 35. The overlay 131 is of such size to span the surface of the translucent sheet 32 so that both marginal edges 170 and 171 may simultaneously reside in both of the channels 130. The marginal edges 170 and 171 have cross-sectional configurations generally similar to those of the respective channels 130 into which they may be positioned. As best seen in FIG. 17, the upper edge portion 171 is slightly longer than the lower edge portion 170. Thus, the overlay 131 may be positioned over the translucent sheet 32 in contacting relation therewith by either of two methods. The overlay 131 may be inserted from a lateral edge of the viewer 10 so that the edge portions 170 and 171 are inserted simultaneously into the open ends of the channels 130. Alternatively, the overlay 131 may be tilted slightly to insert the entire upper edge portion 171 into the channel 130b and then moving the overlay 131 back against the translucent sheet 32 and finally moving the overlay 131 toward the channel 130a to insert the entire smaller lower edge portion 170 therein. The relative spacing between the channels 130 prevent the upper edge portion 171 from moving completely out of the channel 130b. As a result, the overlay 131 fits into and is retained in the channels 130. Consequently, the viewer 20 may be positioned in any desired orientation, some of which are illustrated in FIGS. 1, 2, and 11-14. Referring again to FIGS. 15-18, the lower marginal edge portion 170 is defined by the rearward wall 149 and the wall 159 of the lowermost elongate member 135. The upper marginal edge portion 171 of the overlay 131 is defined by the forward wall 144 and the rearward wall 145 of the uppermost elongate member 135.

Referring to FIGS. 1, 4, and 5, a film retaining clip 180 is illustrated. The retaining clip 180 is configured so that the base mounting portion may be properly placed within the channel 130. The clip 180 as will be seen is adapted to retain large transparencies 182 such as photographic negatives of X-rays, which are flexible and are less rigid than the transparency slides 132. The retaining clip 180 is a spring clip and is generally U-shaped with arcuate legs 184 and 185. The base of the retaining clip 180 has a configuration similar to that of the channels 130 so that the clip when compressed may be inserted therein and be movably longitudinally therealong. The lower leg 184 has an upturned end 187 permitting the transparencies 182 to be inserted between the clip 180 and the translucent sheet 32 with some ease. When a transparency is slid under the lower leg 184, the lower leg 184 is cammed upwardly. Because of the inherent resiliency of the retaining clip 180, the transparency 182 is held in place firmly against the upper surface 37 of the translucent sheet 32. The channel 130 is provided with an segment 190 of the upper leg 185 so as to prevent the retaining clip 180 from moving out of the channel 130 along the translucent sheet 32 while permitting movement longitudinally of the brackets 34 and 35.

Manual deflection of the upper leg 185 downwardly toward the translucent sheet 32 to disengage the raised segment 190 from the groove 188 permits removal of the mounting portion of the retaining clip 180 from the channel 130. The upper leg 185 is bent upwardly away from the lower leg 184 so that the upper leg 185 may be deflected downwardly toward the lower leg 184 sufficiently to permit removal of the retaining clip 180 without interfering with the lower leg 184. The retaining clip 180 may also be removed by sliding it laterally outward from the open end of the channel 130. The grooves 188 formed in the depending wall portions 34b and 35b do not interfere with the placement of the marginal edges 170 and 171 of the overlay 131 into the channels 130. As should be apparent, any number of retaining clips may be placed into the channels 130 at any position desired.

In addition to the advantages provided by the overlay device itself and its unique coaction with the transparency viewer, the present invention provides a highly versatile unit in use. The viewer may be made portable and its low profile enhances the potential areas of use. Furthermore, the viewer affords structure adapting it for a plurality of uses with the translucent illuminated sheet capable of being disposed in a multitude of convenient viewing positions.

I claim:

1. In combination with a transparency viewer having a housing with a translucent top surface, illuminating means within the housing and a pair of spaced leg assemblies extending from the bottom surface of said housing, a pair of supporting frame assemblies for supporting a pair of said viewers, each supporting frame assembly comprising: a base frame portion adapted to be positioned on and supported by a supporting surface, said base frame portion having an open channel facing upwardly of a size at least as great as that of the leg assembly of a first viewer; first means for releasably securing the leg assembly of said first viewer to said base frame portion when said leg assembly is inserted into said channel of said base frame portion; a generally upright frame portion connected to said base frame portion rearward of said channel of said base frame portion, extending upwardly from said base frame portion and having an open channel facing forwardly of a size at least as great as that of the leg assembly of a second viewer; and second means for releasably securing the leg assembly of said second viewer to said upright frame portion when the leg assembly is inserted into said channel of said upright frame portion.

2. The combination of claim 1 wherein each of said frame portions has a generally U-shaped cross section with center section and spaced apart side walls defining their respective open channels.

3. The combination of claim 2 wherein each of said leg assemblies includes a bracket secured to the bottom surface of the housing and a leg pivotally mounted to said bracket swing from a retracted position in close alignment with the bottom surface of the housing and an extended position outward from the bottom surface of the housing, said bracket having a generally U-shaped cross section with a center section secured to the bottom surface of the housing and spaced apart side walls depending from said bracket center section and extending outward from the bottom surface of the housing between which the leg is mounted, said side walls of each of said frame portions being spaced apart a distance slightly greater than said side walls of said bracket so that said bracket may be inserted between the side walls into said open channel of either frame portion.

4. The combination of claim 3 wherein said leg assemblies have resilient pads, the side walls of said frame portions defining a channel having a depth less than the height of said leg assemblies so that said pads rest on the center section of said frame members when the leg assemblies are inserted with the ends of the side walls of the frame portions being spaced slightly from the bottom surface of said housing.

5. The combination of claim 4 wherein said base portion has resilient pads which act as feet for said supporting frame assembly.

6. The combination of claim 1 wherein said upright frame portion has a lower end connected to said base portion and an upper end positioned above and rearward of said lower end so that a viewer secured to said upright frame portion is held in a position tilted from vertical.

7. The combination of claim 6 wherein the angle defined between said base and upright frame portions is approximately 70°.

8. The combination of claim 1 wherein each of said leg assemblies includes a leg member pivotally mounted on the bottom surface of said housing for swinging movement between a retracted position in close alignment with the bottom surface of the housing and an extended position outward from said bottom surface of the housing, and further including means for releasably securing each leg in its retracted position, said first and second means securing the respective legs and frame portions together.

* * * * *